(12) United States Patent
Rakesh et al.

(10) Patent No.: US 8,417,549 B2
(45) Date of Patent: Apr. 9, 2013

(54) SYSTEM AND METHOD FOR SOURCING A DEMAND FORECAST WITHIN A SUPPLY CHAIN MANAGEMENT SYSTEM

(75) Inventors: Ravi Rakesh, Wiesloch (DE); Stefan Merker, Mannheim (DE); Juergen Koenemann, Hamburg (DE); Stefan Resag, Walldorf (DE); Jochen Steinbach, Bad Schoenborn (DE)

(73) Assignee: SAP Aktiengesellschaft, Walldorf (DE)

( * ) Notice: Subject to any disclaimer, the term of this patent is extended or adjusted under 35 U.S.C. 154(b) by 1928 days.

(21) Appl. No.: 11/139,303

(22) Filed: May 27, 2005

(65) Prior Publication Data

US 2006/0271422 A1   Nov. 30, 2006

(51) Int. Cl.
*G06Q 10/00* (2012.01)

(52) U.S. Cl. ............... 705/7.11; 705/7.12

(58) Field of Classification Search ......... 705/7.11–7.42
See application file for complete search history.

(56) References Cited

U.S. PATENT DOCUMENTS

| | | | | |
|---|---|---|---|---|
| 5,974,395 | A * | 10/1999 | Bellini et al. | 705/7.31 |
| 5,983,194 | A * | 11/1999 | Hogge et al. | 705/7.25 |
| 6,167,380 | A * | 12/2000 | Kennedy et al. | 705/7.31 |
| 6,188,989 | B1 * | 2/2001 | Kennedy | 705/7.25 |
| 6,609,101 | B1 * | 8/2003 | Landvater | 705/7.25 |
| 6,671,673 | B1 * | 12/2003 | Baseman et al. | 705/7.26 |
| 6,947,903 | B1 * | 9/2005 | Perry | 705/28 |
| 6,963,847 | B1 * | 11/2005 | Kennedy et al. | 705/7.29 |
| 7,003,474 | B2 * | 2/2006 | Lidow | 705/7.31 |
| 7,054,706 | B2 * | 5/2006 | Kempf et al. | 700/121 |
| 7,080,026 | B2 * | 7/2006 | Singh et al. | 705/7.31 |
| 7,085,729 | B1 * | 8/2006 | Kennedy et al. | 705/7.22 |
| 7,216,086 | B1 * | 5/2007 | Grosvenor et al. | 705/7.11 |
| 7,248,937 | B1 * | 7/2007 | Brown et al. | 700/99 |
| 7,379,781 | B2 * | 5/2008 | Treichler et al. | 700/99 |
| 2002/0042756 | A1 * | 4/2002 | Kumar et al. | 705/26 |
| 2002/0133387 | A1 * | 9/2002 | Wilson et al. | 705/8 |
| 2003/0171962 | A1 * | 9/2003 | Hirth et al. | 705/7 |
| 2005/0004826 | A1 * | 1/2005 | Chen et al. | 705/8 |

OTHER PUBLICATIONS

Managing Your Supply Chain Using Microsoft Axapta (Scott Hamilton, McGraw-Hill, Copyright 2004 pp. 91-103).*
Single vs. Multiple Supplier Sourcing Strategies (Gerard J. Burke, Janice Carrillo, Asoo J. Vakharia, Department of Decision and Information Sciences Warrington College of Business Administration University of Florida Gainesville, FL 32611-7169 Jun. 2004).*

(Continued)

*Primary Examiner* — Lynda Jasmin
*Assistant Examiner* — Alan S Miller
(74) *Attorney, Agent, or Firm* — Blakely, Sokoloff, Taylor & Zafman LLP

(57) ABSTRACT

A system and method are described for intelligently sourcing demand forecasts within a supply chain management ("SCM") system based on a constrained supply chain model, in light of material and resource constraints. For example, a computer implemented method according to one embodiment of the invention comprises: calculating a demand forecast identifying anticipated demand for a product over a specified time period; identifying current sales orders for the product with delivery dates scheduled during the specified time period; generating an open forecast for the product based on the current sales orders and the anticipated demand; and sourcing different percentages of the open forecast from different plants, the percentages selected based on supply chain material and/or resource constraints. In addition, after the demand forecast is sourced, one embodiment of the invention employs additional techniques for intelligently sourcing new sales orders entering the SCM system.

18 Claims, 12 Drawing Sheets

OTHER PUBLICATIONS

The American Heritage® Dictionary of the English Language, Fourth Edition copyright © 2000 by Houghton Mifflin Company. Updated in 2009. Published by Houghton Mifflin Company. http://www.thefreedictionary.com/plant.*

Oracle Advanced Planning—Implementation and User's Guide, vols. 1 and 2, Release 11i Oracle, May 2003.*

Oracle Demand Planning—Users Guide, Release 11i Oracle, Jan. 2002.*

Oracle Inventory User's Guide, Release 11i, May 2003.*

Oracle Order Management—User's Guide, Release 11i, Aug. 2002.*

* cited by examiner

| Customer | Source | DP FC (Jan) | Open FC | Allocation | Sales Orders | Open |
|---|---|---|---|---|---|---|
| $C_1$ | * | 100 | 60 | * | * | * |
| $C_1$ | Plant $P_1$ | * | * | | 10 | |
| $C_1$ | Plant $P_2$ | * | * | | 30 | |

*Fig. 4b*

$SO_{C1}$: 10 (BM) : Desc Char : $C_1$ — 401
$FC_{Dumm}$: 10 (FE) : Desc Char : $C_1$ — 402
FC: 20 (FA) : Desc Char : $C_1$ — 403

$SO_{C1}$: 30 (BM) : Desc Char : $C_1$ — 404
$FC_{Dumm}$: 30 (FE) : Desc Char : $C_1$ — 405
FC: 40 (FA) : Desc Char : $C_1$ — 406

*Fig. 4c*

| Customer | Source | DP FC (Jan) | Open FC | Allocation | Sales Orders | Open |
|---|---|---|---|---|---|---|
| $C_1$ | * | 100 | 60 | * | * | * |
| $C_1$ | Plant $P_1$ | * | * | 30 | 10 | 20 |
| $C_1$ | Plant $P_2$ | * | * | 70 | 30 | 40 |

*Fig. 5b*

| Product Allocations (gATP) | | | | | |
|---|---|---|---|---|---|
| | W1 | W2 | W3 | W4 | W5 |
| PR$_1$, C$_1$, P$_1$ | 100 | 150 | 70 | 200 | 75 |
| PR$_1$, C$_1$, P$_2$ | 65 | 110 | 67 | 115 | 65 |

*Fig. 7a*

Product Allocations (gATP)

| | W1 | W2 | W3 | W4 | W5 |
|---|---|---|---|---|---|
| PR$_1$, C$_1$, P$_1$ | 100 (+20 = 120) | 150 | 70 | 200 | 75 |
| PR$_1$, C$_1$, P$_2$ | 65 (+40 = 105) | 110 | 67 | 115 | 65 |

Add Open Forecast Value (20) to Product Allocation Value

Add Open Forecast Value (40) to Product Allocation Value

*Fig. 7b*

SYSTEM AND METHOD FOR SOURCING A DEMAND FORECAST WITHIN A SUPPLY CHAIN MANAGEMENT SYSTEM

BACKGROUND

1. Field of the Invention

This invention relates generally to the field of data processing systems. More particularly, the invention relates to a system and method for sourcing a demand forecast within a supply chain management ("SCM") system.

2. Description of the Related Art

Certain software applications are designed to comprehend complicated scheduling tasks. For example, a supply-chain-management ("SCM") software application is typically designed to comprehend the resources in a supply chain (e.g., raw materials, manufacturing equipment, distribution, warehousing, etc) and schedule their usages (also referred to as "activities") so that a specific "supply" of product can be provided at one or more places at specific times to meet the anticipated "demand" for the product.

More advanced SCM applications provide functions for intra- and inter-company supply chain planning and for scheduling and monitoring of associated supply chain processes. For example, the assignee of the present application has developed an advanced supply chain management platform known as the Advanced Planner & Optimizer ("APO") which, as described in Gerhard Knolmayer, et al., SUPPLY CHAIN MANAGEMENT BASED ON SAP SYSTEMS (hereinafter "Knolmayer"), includes different modules for implementing various interrelated SCM functions. These modules include a demand planning ("DP") module, a supply network planning ("SNP") module, a production planning and detailed scheduling ("PP/DS") module, a transportation planning/vehicle scheduling ("TPNS") module and an available to promise ("ATP") module. The following is a brief overview of each of these components.

The ability to accurately forecast demand is an important precondition to any production planning schedule. With this goal in mind, the DP module attempts to determine the demand for a product over a specified time period. By way of example, FIG. 1 illustrates a DP module 101 which has anticipated the demand for a particular product (P1) by a particular customer (C1) for January (100 units), February (150 units) and March (100 units). As indicated in FIG. 1, current demand planning techniques are largely based on empirical data 100 for a given product (e.g., historical demand data stored within an archiving system or data warehouse).

SNP and PP/DS both fall into the general category of "advanced planning and scheduling" or "APS" which involves the planning and scheduling of materials and resources within the supply chain. SNP differs from PP/DS in terms of the time horizon used for planning and scheduling. SNP is used for tactical (i.e., midterm) planning, whereas PP/DS is used for operational (i.e., short-term) planning. For example, a typical planning horizon for SNP may be in the range of 3-6 months whereas a typical planning horizon for PP/DS may be in the range of 1-7 days.

The TP/VS module employs techniques to optimize the delivery of products using different transportation routes and vehicles. It enables manufacturers, retailers, and logistics providers to coordinate transportation resources via the Internet and to synchronize transportation decisions and activities. The transportation planning component of TPNS focuses on medium- to long-term planning whereas the vehicle scheduling component focuses on short-term planning and routing.

Finally, the ATP module is responsible for determining whether a product can be promised by a specified delivery date in response to a customer request. If a given product is not in stock, ATP coordinates with other modules such as PP/DS to determine whether the product can be procured from alternate sources and/or manufactured in time to fulfil the customer request.

One problem which exists with current SCM systems is the lack of coordination between the demand planning component and the other system components. As mentioned above, the demand planning forecast is typically propagated through the supply chain based on empirical rules rather than in an optimized manner. Current demand planning forecasts do not factor variables such as material and resource constraints existing along various levels of the supply chain. As a result, current systems are incapable of intelligently sourcing the demand forecast in light of these constraints. In addition, once a demand forecast is sourced, current systems do not provide adequate coordination when sourcing subsequent sales orders entering the system. Accordingly, what is needed is an SCM system which employs more intelligent sourcing decisions using improved communication and coordination between demand planning and other SCM system components.

SUMMARY

A system and method are described for intelligently sourcing demand forecasts within a supply chain management ("SCM") system based on a constrained supply chain model, in light of material and resource constraints. For example, a computer implemented method according to one embodiment of the invention comprises: calculating a demand forecast identifying anticipated demand for a product over a specified time period; identifying current sales orders for the product with delivery dates at the ship-to party scheduled during the specified time period; generating an open forecast for the product based on the current sales orders and the empirically calculated DP forecast; and sourcing the open forecast from different plants, the percentages selected based on supply chain material and/or resource constraints. In addition, after the demand forecast is sourced, one embodiment of the invention employs additional techniques for intelligently sourcing new sales orders entering the SCM system.

BRIEF DESCRIPTION OF THE DRAWINGS

A better understanding of the present invention can be obtained from the following detailed description in conjunction with the following drawings, in which:

FIGS. 4a-c provide an example in which a demand forecast is sourced taking existing sales orders into consideration.

FIGS. 5a-b proceed with the example in determining open forecast values for different plants.

FIGS. 7a-b illustrate how product allocations within available to promise module are modified based on open forecast values.

DETAILED DESCRIPTION OF PREFERRED EMBODIMENTS

Described below is a system and method for performing bucket-oriented capacity checks within a supply chain management ("SCM") system. Throughout the description, for the purposes of explanation, numerous specific details are set forth in order to provide a thorough understanding of the present invention. It will be apparent, however, to one skilled in the art that the present invention may be practiced without some of these specific details. For example, although many of the embodiments described herein are based on the APO and/or R/3 architectures developed by the assignee of the present application, the underlying principles of the invention are not limited to any specific SCM architecture. In other instances, well-known structures and devices are shown in block diagram form to avoid obscuring the underlying principles of the present invention.

Embodiments of the Invention

Rather than simply propagating a demand forecast through the supply chain based on empirical rules as in prior SCM systems, one embodiment of the invention employs optimization techniques to source demand forecasts based on a constrained supply chain model (i.e., taking material and resource constraints into consideration). In addition, after the demand forecast is sourced, one embodiment of the invention employs techniques for intelligently sourcing new sales orders.

Figure 2:
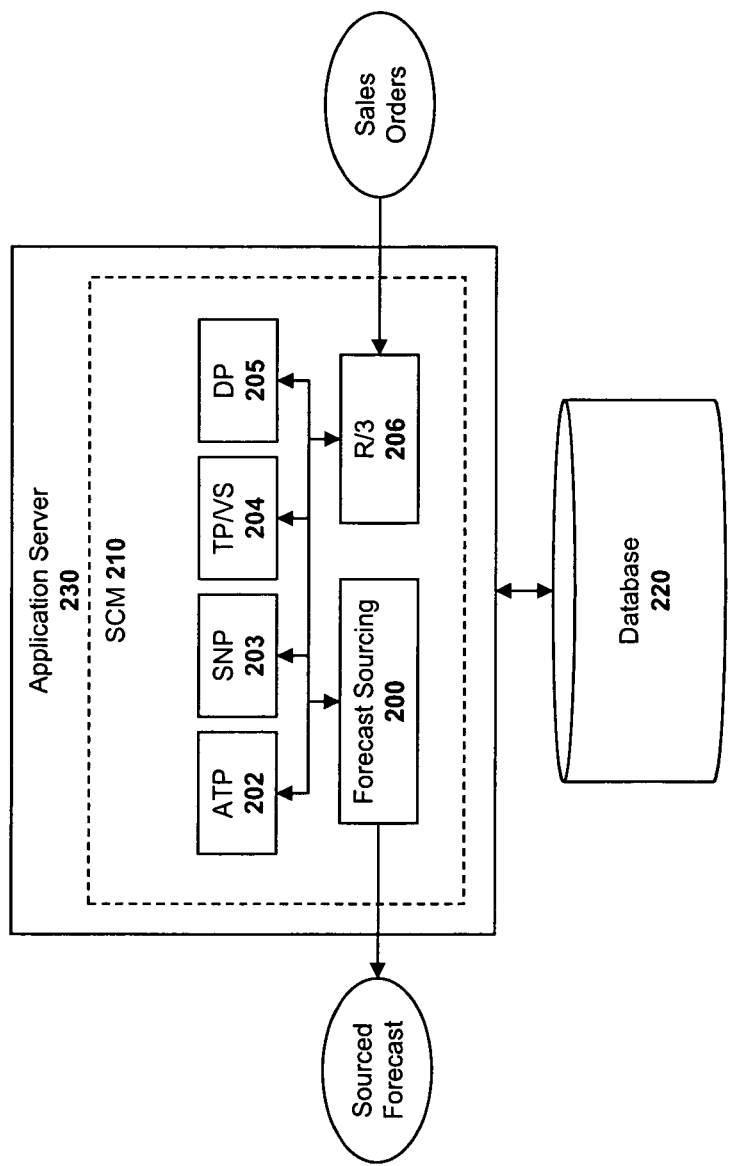
FIG. 2 illustrates a system for sourcing a demand forecast according to one embodiment of the invention.

FIG. 2 illustrates one embodiment of the invention which includes a forecast sourcing module 200 for executing the forecast sourcing techniques described herein. As illustrated, the forecast sourcing module 200 is part of a larger SCM application 210 executed on an application server 230. To perform its calculations related to forecast sourcing, the forecast sourcing module 200 communicates with various other modules within the SCM application 210 including an available to promise ("ATP") module 202, a supply network planning ("SNP") module 203, a transportation planning/vehicle scheduling ("TP/VS") module 204, and a demand planning ("DP") module 205. In addition, in one embodiment, the forecast sourcing module 200 communicates with existing RI3 systems 206 (e.g., to receive data related to new sales orders). The SCM system also includes an SCM database 220 for storing persistent data related to the various SCM processes. In one embodiment, each of the modules illustrated in FIG. 2 are implemented as program code stored in memory and executed by a central processing unit on an application server 230 (or spread across multiple application servers). Once again, however, the underlying principles of the invention are not limited to any specific hardware/software or SCM application architecture.

Figure 1:
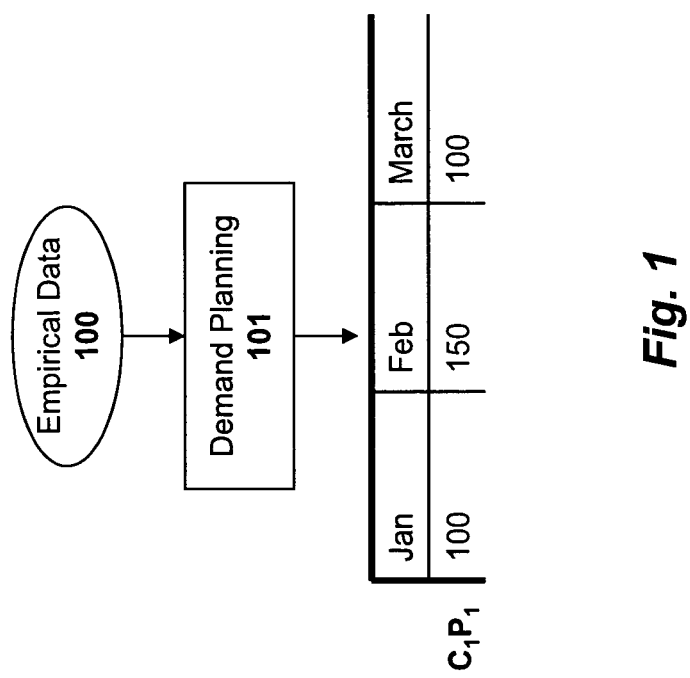
FIG. 1 illustrates demand planning used in prior art supply chain management systems.
Figure 3:
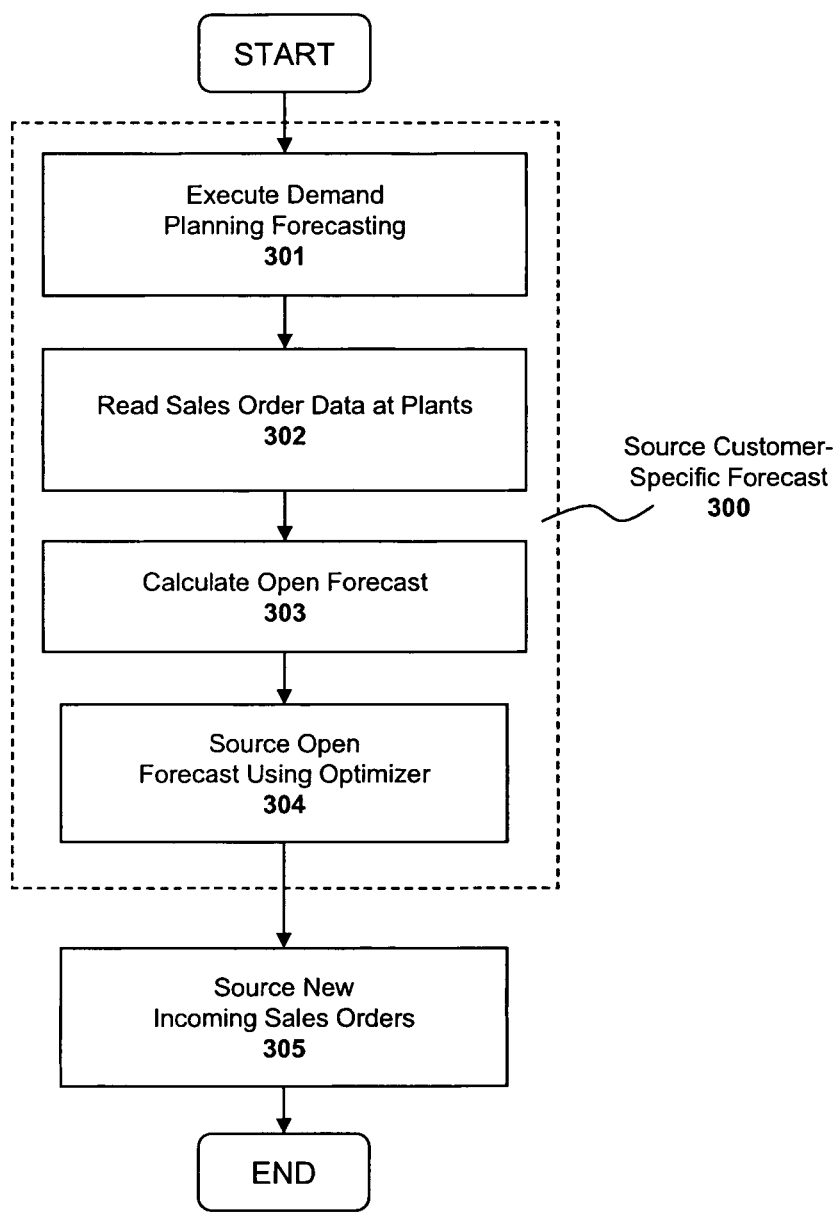
FIG. 3 illustrates a method for sourcing a demand forecast according to one embodiment of the invention.

FIG. 3 illustrates a method for sourcing a forecast according to one embodiment of the invention. The method includes a first section 300 for sourcing a customer-specific forecast and a second section 305 for sourcing new sales orders once the customer-specific forecast has been generated. Within the first section, at 301, the DP module 205 initially calculates a monthly customer-specific demand forecast for a particular product, similar to that illustrated in FIG. 1 (e.g., using historical demand data). In one embodiment, the demand forecast is calculated in the same manner as in previous SCM systems including, but not limited to, APO.

Figure 4A:
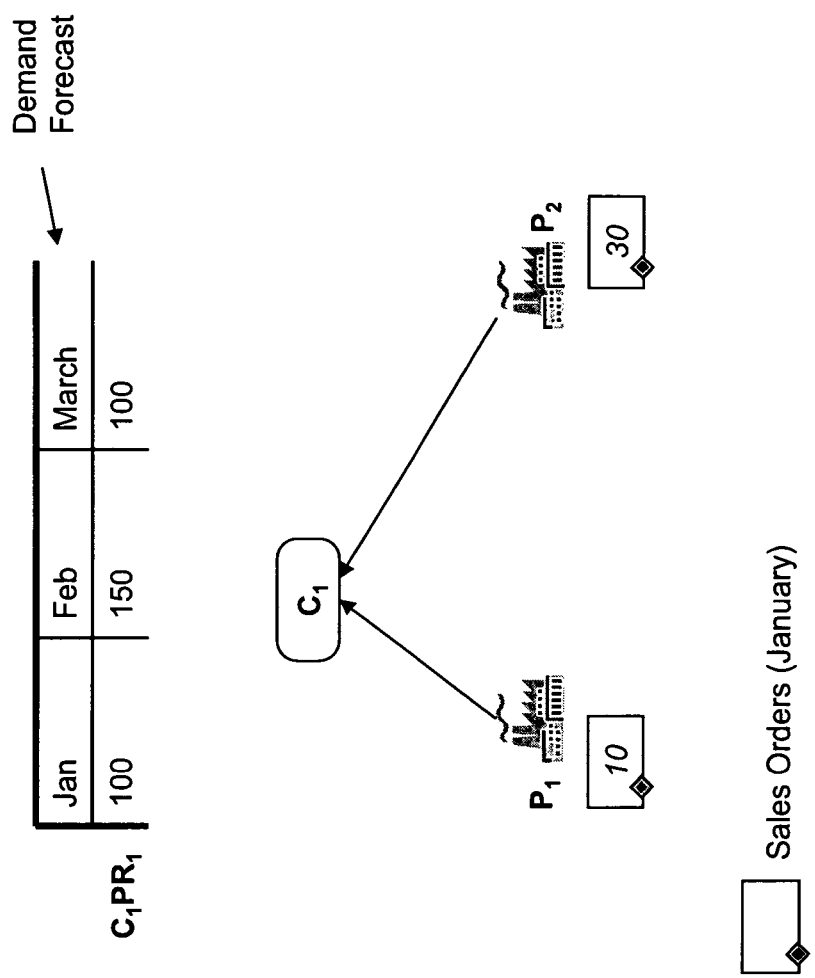

After the demand forecast is generated, at 302, existing customer-specific sales orders for the product are identified so that they can be factored in to the calculation of the open forecast. By way of example, as illustrated graphically in FIG. 4a a customer $C_1$ has previously entered sales orders scheduled for a January delivery in the amount of 40 units: 10 units which are scheduled to be sourced from plant $P_1$ and 30 units which are scheduled to be sourced from plant $P_2$. At 303, the sales orders are subtracted from the demand forecast to arrive at "open forecast" value according to the following equation: Open Forecast=Customer-Specific Forecast−Cumulated Sales Order Quantities. Thus, in the example shown in FIG. 4a : Open Forecast=100−(30+10)=60. For the purpose of illustration, these values are arranged within the table shown in FIG. 4b. If the cumulated sales order quantities is greater than the customer-specific forecast, then the open forecast is set equal to zero.

In addition, in order to protect the sourced forecast orders from being consumed by the already-existing sales orders at each plant, one embodiment of the invention creates "dummy" forecast orders for each existing sales order within the SCM application 210. For example, as shown in FIG. 4c, dummy forecast 402 is created with a value equal to sales order 401 to protect sourced forecast order 403 from being consumed by sales order 401; and dummy forecast 405 is created with a value equal to sales order 404 to protect sourced forecast order 406 from being consumed by sales order 404. The "descriptive characteristics" for each of the sales orders and forecast orders define the specific product, plant, and customer associated with the order.

Essentially, the forecast orders (identified with order type "FE") are created at the plant location when the DP forecast at the customer location is propagated to the plant locations. These forecast orders are essentially placeholders for subsequent incoming sales orders (order type "BM") in that they represent a demand quantity for the SNP process. Therefore, in order that the demand quantity does not increase disproportionately, for every incoming sales order, the net quantity of the forecast order decreases by the net quantity of the incoming sales order. This takes place for every product at the plant location. This process of reduction in the forecast order quantity is known as "consumption."

"Dummy" forecast orders are a new order type introduced in the present application. When DP forecast at the customer location is sourced to the plant locations, by default a consumption process is called. This call to the consumption process would decrease the net quantity of the sourced forecast orders by the net quantity of the sales order at each plant location. This behavior would be inconsistent with the principle of the sourcing process because the net quantity after sourcing would be less than the net quantity before the sourcing takes place. In order to avoid this inconsistency, the sourced forecasts orders have to be "protected" from the existing sales orders at the plant locations. This is realized by creating dummy forecast orders (order type "FA") which are immediately consumed by the existing sales orders thereby preventing a consumption of the sourced forecast orders.

In one embodiment, after the dummy forecast orders have been created, and the open forecast has been calculated, these values are provided to an optimizer within the SNP module 203 which, at 304, attempts to source the open forecast in the most efficient manner possible, given the current material and resource constraints. The SNP optimizer is a well known component of the SNP module 203 of APO.

Figure 5A:
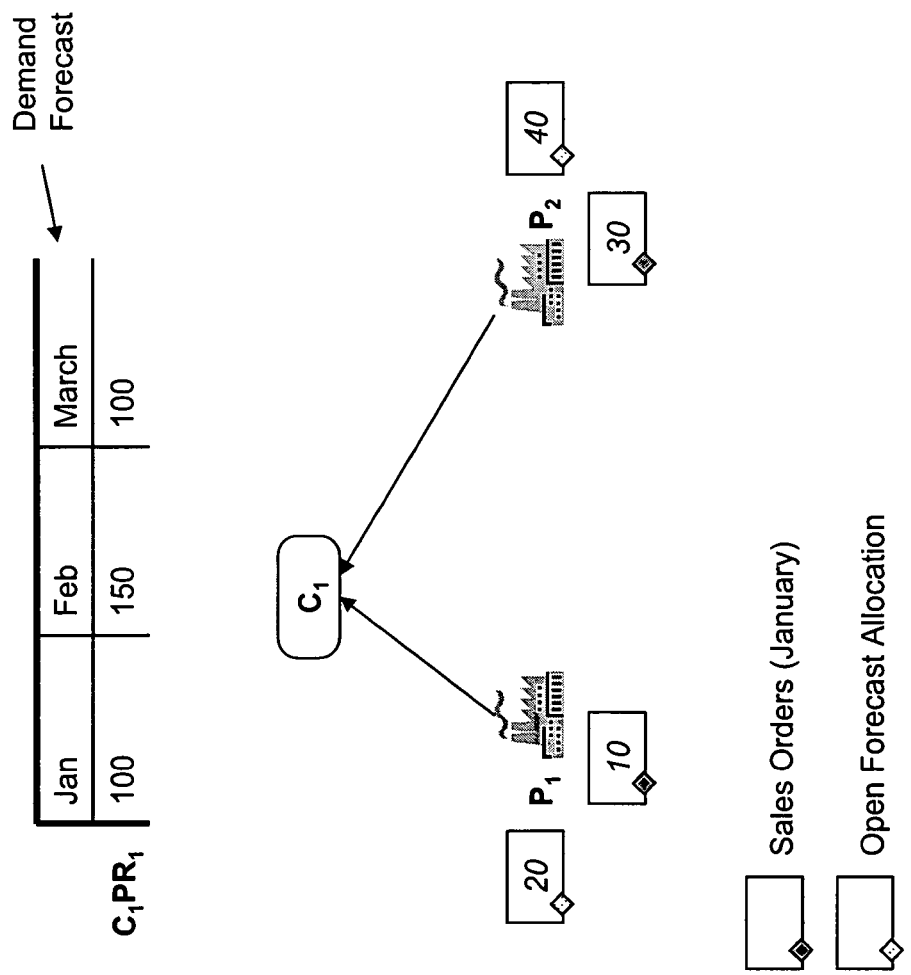

An exemplary allocation of the open forecast is illustrated in FIG. 5a, which shows 20 units of the open forecast sourced from plant $P_1$ and 40 units of the open forecast sourced from $P_2$. As indicated in the table in FIG. 5b, this results in a total allocation (i.e., sourced forecast+sales orders) of 30 from plant $P_1$ and 70 from plant $P_2$.

Figure 6:
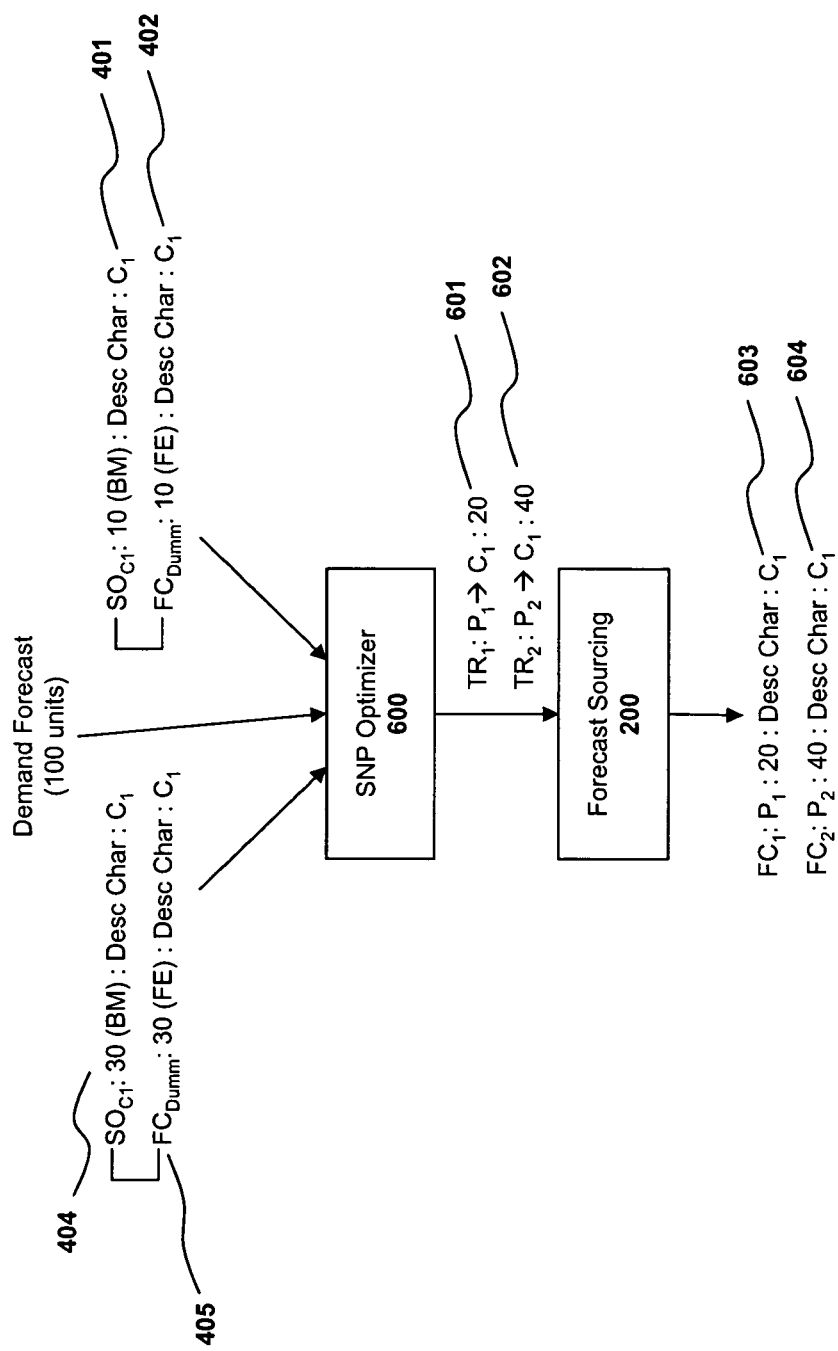
FIG. 6 illustrates one embodiment of the invention in which transportation orders used as an intermediate data format for sourcing a forecast.

In one embodiment of the invention, the SNP module 203 does not create the forecast orders directly. Rather, it creates "transportation orders" representing the forecast orders which would normally be processed by the TPNS module 204. The forecast sourcing module 200 then intervenes and converts the transportation orders into forecast orders with descriptive characteristics. The descriptive characteristics provide a means to identify the customer location associated with each forecast order thereby facilitating a consistent consumption process. This technique is illustrated in FIG. 6 which shows transportation orders 601, 602, generated by the SNP optimizer 600 based on sales orders 401, 404; dummy forecast orders 402, 405; and the demand forecast (100 units). Each of the transportation orders 601, 602 include a source $P_1$, $P_2$ a destination $C_1$, $C_2$ and an amount (i.e., 20 units for transportation order 601 and 40 units for transportation order 602). The transportation orders 601, 602 are then converted to sourced forecast orders 603, 604 by the forecast sourcing module 200. Each transportation order has an associated start date and a delivery date. In one embodiment, the transportation orders are generated so that their delivery date coincides with the start of the time-bucket of the demand forecast (e.g., January 1 in the above example). Using the transportation order mechanism described above, the forecast sourcing process may be in integrated within current APO systems in a transparent manner (i.e., without significant modification to existing modules such as SNP modules 203 and TPNS modules 204).

Turning again to the overall process shown in FIG. 3, at 305, one embodiment of the invention sources new sales orders based on the sourcing decision for the customer-specific forecast. The sales orders are created and processed using the descriptive characteristics mentioned above (i.e., customer ID, product ID, plant ID) and are checked against the customer-specific allocations.

By way of example, FIG. 7a illustrates an exemplary ATP global product allocation table with time-buckets divided into weeks. The numbers within each time bucket indicate the number of units of a product available to be promised during that week. For example, in week 1 (W1), the ATP module can promise 100 units to customer $C_1$ for delivery from plant $P_1$ and can promise 65 units for delivery from plant $P_2$.

As indicated in FIG. 7b, in one embodiment of the invention, the open customer-specific forecast for each plant is added to the product allocation values. For example, the open forecast of 20 for customer $C_1$, plant $P_1$ is added to the product allocation of 100 units in week 1, resulting in a new value of 120 units. Similarly, the open forecast of 40 for customer $C_1$, plant $P_2$ is added to the product allocation of 65 in week 1, resulting in a new value of 105 units. As a result, if a new sales order of 110 units is received (e.g., from R/3), the order may be promised to the customer and sourced from a single plant $P_1$ (resulting in a remaining product allocation of 120−110=10 for that plant). Prior to the forecast sourcing techniques described herein, only 100 units would show up as being "available" to promise from plant $P_1$ and the remaining 10 would need to be sourced from another plant $P_2$.

ATP product allocations typically operate on weekly buckets as described above. One embodiment of the invention automatically performs the necessary adjustments associated with a transition from a monthly to a weekly time bucket profile (i.e., subdividing the monthly bucket into a plurality of weekly buckets). This conversion is respected while updating the ATP Allocation structures. Once the allocation structures are appropriately updated, subsequent sales orders are sourced based on the updated values and the standard process takes over from this point on.

Figure 8:
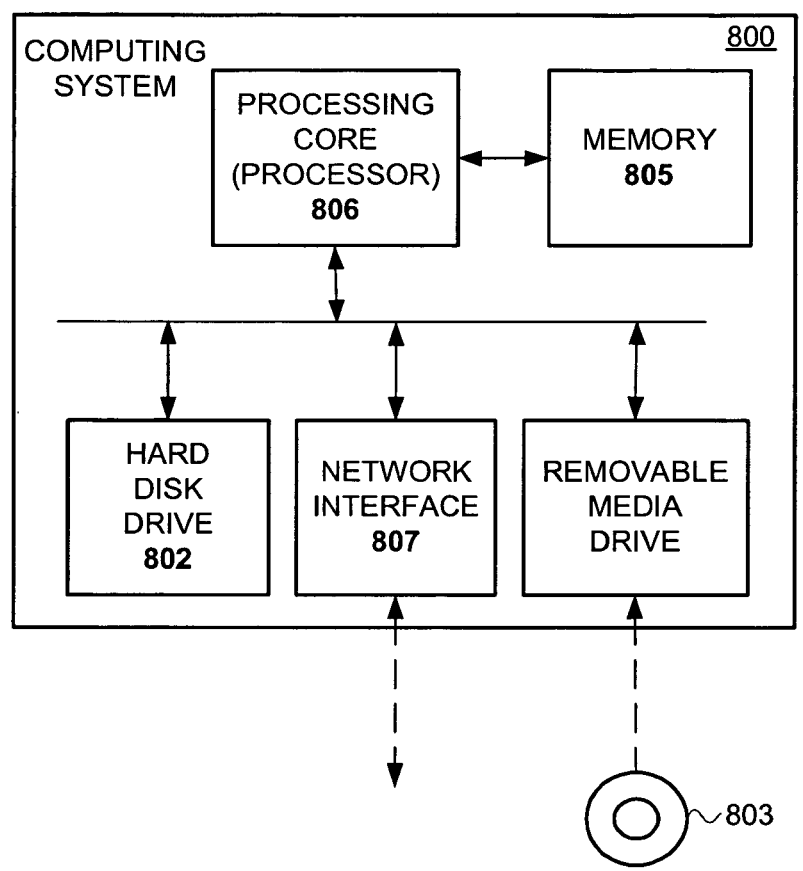
FIG. 8 illustrates an exemplary computer system on which embodiments of the invention may be executed.

FIG. 8 is a block diagram of an exemplary computing system 800 that can execute program code stored by an article of manufacture. It is important to recognize that the computing system block diagram of FIG. 8 is just one of various computing system architectures on which the embodiments of the invention may be implemented. The applicable article of manufacture may include one or more fixed components (such as a hard disk drive 802 or memory 805) and/or various movable components such as a CD ROM 803, a compact disc, a magnetic tape, etc. In order to execute the program code, typically instructions of the program code are loaded into the Random Access Memory (RAM) 805; and, the processing core 806 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 806. In one particular embodiment, the computing system 800 is the SAP Web Application Server currently available from SAP AG.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

The present invention may also be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the description above focused on single-activity resources, the same general principles apply to other resources (e.g., multi-activity resources). Accordingly, the scope and spirit of the invention should be judged in terms of the claims which follow.

What is claimed is:

1. A computer-implemented method comprising:
    determining a demand forecast for a level in a supply chain, the demand forecast identifying anticipated demand from the level for a product over a specified time period;
    determining total unfulfilled sales orders for the product with delivery dates scheduled during the specified time period for the level within the supply chain;
    reducing the anticipated demand by the unfulfilled sales order in a processing unit to generate an open forecast for the level;

sourcing different percentages of the open forecast from different plants in the level based on supply chain material and/or resource constraints;
creating, with a processor, a dummy forecast order; and
consuming, using the processor, the dummy forecast order with an existing sales order.

2. The method as in claim 1 wherein determining total unfulfilled sales orders comprises adding unfulfilled sales orders from a plurality of different plants while respecting various time bucket profiles which may have been defined at different locations.

3. The method as in claim 1 wherein the demand forecast, unfulfilled sales orders and open forecast are for a specific customer and a specific product.

4. The method as in claim 1 further comprising:
updating current available to promise ("ATP") product allocations based on the sourcing of the open forecast by adding the open forecast to the product allocation on a per plant basis.

5. The method as in claim 1 further comprising:
receiving additional sales orders;
sourcing the additional sales orders based on current product allocations from each of the plants and/or the percentages of the open forecast sourced from each of the plants.

6. The method of claim 1 further comprising:
creating a dummy forecast order; and
consuming the dummy forecast order with an existing sales order.

7. The method of claim 1 further comprising:
receiving a transportation order; and
converting the transportation order into a sourced forecast order.

8. A supply chain management system comprising:
a processor;
a demand planning module to determine a demand forecast identifying anticipated demand for a product over a specified time period for a level of the supply chain; and
a forecast sourcing module to determine total unfulfilled sales orders for the product with delivery dates scheduled during the specified time period for the level of the supply chain; to generate an open forecast for the product based on the unfulfilled sales orders and the anticipated demand; and to source different percentages of the open forecast from different plants based on supply chain material and/or resource constraints; the forecast sourcing module further creating a dummy forecast order that is consumed by an existing sales order.

9. The system as in claim 8 wherein determining total unfulfilled sales orders comprises adding unfulfilled sales orders from a plurality of different plants while respecting location specific definition of time bucket profile.

10. The system as in claim 8 wherein the demand forecast, unfulfilled sales orders and open forecast are for a specific customer and a specific product.

11. The system as in claim 8 wherein to generate the open forecast, the forecast sourcing module subtracts the total unfulfilled sales orders from the anticipated demand respecting location specific definition of time bucket profile.

12. The system as in claim 8 wherein the forecast sourcing module updates current available to promise ("ATP") product allocations based on the sourcing of the open forecast by adding the open forecast to the product allocation on a per plant basis.

13. The system as in claim 8 further comprising:
an available to promise module to receive additional sales orders and forwards information related to the sales orders to the forecast sourcing module, wherein the forecast sourcing module sources the additional sales orders based on current product allocations from each of the plants and/or the percentages of the open forecast sourced from each of the plants.

14. A non-transitory machine-readable medium having program code stored thereon which, when executed by a machine, causes the machine to perform the operations of:
determining a demand forecast for a level in a supply chain, the demand forecast identifying anticipated demand for a product over a specified time period for the level within the supply chain;
determining total unfulfilled sales orders for the product with delivery dates scheduled during the specified time period for the level within the supply chain;
reducing the anticipated demand by the unfulfilled sales order in a processing unit to generate an open forecast for the level;
sourcing different percentages of the open forecast from different plants in the level based on supply chain material and/or resource constraints;
creating a dummy forecast order; and
consuming the dummy forecast order with an existing sales order.

15. The machine-readable medium as in claim 14 wherein determining total unfulfilled sales orders comprises adding unfulfilled sales orders from a plurality of different plants.

16. The machine-readable medium as in claim 14 wherein the demand forecast, unfulfilled sales orders and open forecast are for a specific customer and a specific product.

17. The machine-readable medium as in claim 14 including additional program code to cause the machine to perform the operations of: updating current available to promise ("ATP") product allocations based on the sourcing of the open forecast by adding the open forecast to the product allocation on a basis.

18. The machine-readable medium as in claim 14 including additional program code to cause the machine to perform the operation of:
receiving additional sales orders;
sourcing the additional sales orders based on current product allocations from each of the plants and/or the percentages of the open forecast sourced from each of the plants.

* * * * *

UNITED STATES PATENT AND TRADEMARK OFFICE
CERTIFICATE OF CORRECTION

PATENT NO. : 8,417,549 B2
APPLICATION NO. : 11/139303
DATED : April 9, 2013
INVENTOR(S) : Ravi Rakesh et al.

Page 1 of 1

It is certified that error appears in the above-identified patent and that said Letters Patent is hereby corrected as shown below:

In the Claims, Column 8, Claim 17, line 46, please delete "basis" and insert --per plant basis--.

Signed and Sealed this
Second Day of July, 2013

Teresa Stanek Rea
*Acting Director of the United States Patent and Trademark Office*